(12) United States Patent
Flick

(10) Patent No.: US 6,696,938 B2
(45) Date of Patent: Feb. 24, 2004

(54) VEHICLE SECURITY SYSTEM INCLUDING A STROBE LIGHT CONFIRMATION INDICATOR AND RELATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 65 days.

(21) Appl. No.: 09/896,326

(22) Filed: Jun. 29, 2001

(65) Prior Publication Data

US 2003/0001728 A1 Jan. 2, 2003

(51) Int. Cl.[7] .................................................. B60Q 1/26
(52) U.S. Cl. ............. 340/468; 340/426.13; 340/426.23; 340/426.28; 340/5.72
(58) Field of Search ............................ 340/426, 425.5, 340/430, 825.69, 825.72, 469, 471, 5.6, 5.61, 3.31, 3.32; 307/10.2, 10.5

(56) References Cited

U.S. PATENT DOCUMENTS

| | | | |
|---|---|---|---|
| 4,143,368 A | * 3/1979 | Route et al. ................ 340/543 |
| 4,383,242 A | * 5/1983 | Sassover et al. ............. 340/64 |
| 4,797,673 A | 1/1989 | Dombrowski ............... 340/904 |
| 4,851,813 A | 7/1989 | Gottlieb ....................... 340/474 |
| 4,864,298 A | 9/1989 | Dombrowski ............... 340/904 |
| 4,903,007 A | 2/1990 | Gottlieb ....................... 340/474 |
| 4,958,143 A | 9/1990 | Knauff ......................... 340/479 |
| 5,028,920 A | 7/1991 | Dombrowski ............... 340/904 |
| 5,047,747 A | 9/1991 | Gottlieb ....................... 340/463 |
| 5,181,019 A | 1/1993 | Gottlieb et al. ............. 340/474 |
| 5,198,798 A | 3/1993 | Lietzow et al. ............. 340/539 |
| RE34,773 E | 11/1994 | Dombrowski ............... 340/904 |
| 5,424,715 A | 6/1995 | Lietzow et al. ............. 340/539 |
| 5,440,288 A | 8/1995 | Gottlieb et al. ............. 340/463 |
| 5,515,026 A | 5/1996 | Ewert .......................... 340/436 |
| 5,515,285 A | 5/1996 | Garrett, Sr. et al. ........ 364/460 |
| 5,568,120 A | 10/1996 | LeMense et al. ............ 340/426 |
| 5,619,074 A | 4/1997 | Berch et al. ................ 307/10.2 |
| 5,650,765 A | 7/1997 | Park ............................ 340/436 |
| 5,682,136 A | 10/1997 | Del Signore ................ 340/436 |
| 5,785,413 A | 7/1998 | Tillinghast et al. ......... 362/228 |
| 5,801,646 A | * 9/1998 | Pena ............................ 340/902 |
| 5,838,227 A | 11/1998 | Murray .................... 340/425.5 |
| 5,844,471 A | 12/1998 | Daniel ......................... 340/436 |
| 5,894,272 A | 4/1999 | Brassier et al. ............. 340/602 |
| 5,914,651 A | 6/1999 | Smalls ......................... 340/436 |
| 6,028,505 A | 2/2000 | Drori ........................... 340/426 |
| 6,049,273 A | 4/2000 | Hess ............................ 340/539 |
| 6,153,981 A | * 11/2000 | Thomas et al. ............. 315/241 |
| 6,380,865 B1 | * 4/2002 | Pederson ............... 340/815.45 |

FOREIGN PATENT DOCUMENTS

GB 2344442 6/2000 ............ B60Q/1/00

* cited by examiner

Primary Examiner—Phung Nguyen
(74) Attorney, Agent, or Firm—Lisa K. Jorgenson; Allen, Dyer, Doppelt, Milbrath & Gilchrist, P.A.

(57) ABSTRACT

A vehicle security system includes at least one vehicle sensor, a remote transmitter to be carried by a user, and a controller positioned in the vehicle. The controller may be switchable to at least one of an armed mode and a disarmed mode based upon the remote transmitter, and the controller may cause a light indicator circuit of the vehicle to selectively supply power to at least one vehicle light bulb upon switching to at least one of the armed and disarmed modes. The vehicle security system may also include a strobe light device at the vehicle and electrically connected to the light indicator circuit for providing a confirmation indication to the user that the controller has been switched to at least one of the armed and disarmed modes. This may be done based upon a leading or trailing edge of the power supplied by the light indicator circuit.

40 Claims, 2 Drawing Sheets

US 6,696,938 B2

VEHICLE SECURITY SYSTEM INCLUDING A STROBE LIGHT CONFIRMATION INDICATOR AND RELATED METHODS

FIELD OF THE INVENTION

The present invention relates to the field of vehicles, and, more particularly, to vehicle security systems.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle when the security system is armed. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. The remote transmitter may be used to arm and disarm the vehicle security system or provide other remote control features from a predetermined range away from the vehicle.

Such vehicle security systems may confirm to the user that a signal from the remote transmitter has been received by the controller at the vehicle. For example, the controller may cause the vehicle's parking lights to blink and/or cause the horn or siren to sound to confirm receipt of the signal. An example of such a system is disclosed in U.S. Pat. No. 6,028,505 to Drori. Moreover, such vehicle systems may also be used in vehicles with power door locks to operate the power door locks based upon the remote transmitter. In such cases, this signal confirmation technique may similarly be used to verify that a lock or unlock signal has been received from the remote transmitter, for example.

One limitation of such prior art systems is that the visual confirmation indication provided by typical vehicle light bulbs may not be bright enough for the user to easily distinguish. This may be particularly true if the user has walked some distance from the vehicle before using the remote transmitter. Further, the user may not wish to have a sound generated as a confirmation indication.

SUMMARY OF THE INVENTION

In view of the foregoing background, it is therefore an object of the invention to provide a vehicle security system that provides improved visual confirmation indications.

This and other objects, features, and advantages in accordance with the present invention are provided by a vehicle security system for a vehicle including at least one vehicle light bulb and a light indicator circuit for providing power thereto. The vehicle security system may include at least one vehicle sensor, a remote transmitter to be carried by a user, and a controller positioned in the vehicle and electrically connected to the light indicator circuit. The controller may be switchable to at least one of an armed mode and a disarmed mode based upon the remote transmitter, and the controller may cause the light indicator circuit to selectively supply power to the at least one vehicle light bulb upon switching to at least one of the armed and disarmed modes. In the armed mode, the controller may generate an alarm indication responsive to the at least one vehicle sensor.

Furthermore, the vehicle security system may also include a strobe light device at the vehicle and electrically connected to the light indicator circuit for providing a confirmation indication to the user that the controller has been switched to at least one of the armed and disarmed modes. This may be done based upon at least one of a leading edge and a trailing of the power supplied by the light indicator circuit to the at least one vehicle light bulb. Also, the confirmation indication may have a duration less than a duration of the selectively supplied power.

More particularly, the strobe light device may provide the confirmation indication for a predetermined duration. The vehicle may also include at least one vehicle light bulb connector electrically connected to the light indicator circuit, and the strobe light device may be electrically connected to the light indicator circuit via the at least one vehicle light bulb connector.

The strobe light device may include a strobe connector electrically connected to the at least one vehicle light bulb connector, a strobe light bulb carried by the strobe connector, and a control circuit for receiving power and causing the strobe light bulb to provide the confirmation indication. More specifically, the control circuit may include at least one capacitor for storing and discharging power. Additionally, the at least one vehicle light bulb connector may be a socket, and the strobe connector may be a plug for mating with the socket. For example, the socket may be a parking light bulb socket. The strobe light device may also include a light bulb connector carried by the strobe connector, and the at least one vehicle light bulb may be carried by the light bulb connector. Moreover, the strobe light bulb may have a greater luminosity than the at least one vehicle light bulb.

Additionally, the vehicle may also include power door locks, and the controller may selectively operate the power door locks based upon the remote transmitter. Accordingly, the strobe light device may provide the confirmation indication to the user to indicate that the controller has selectively operated the power door locks.

A method aspect of the invention is for operating a vehicle security system for use with a vehicle comprising at least one vehicle light bulb and a light indicator circuit for providing power thereto. The vehicle security system may include a remote transmitter to be carried by a user and a controller positioned in the vehicle and connected to the light indicator circuit. Further, the controller may be switchable to at least one of an armed mode and a disarmed mode based upon the remote transmitter. Also, the controller may cause the light indicator circuit to selectively supply power to the at least one vehicle light bulb upon switching to at least one of the armed and disarmed modes. The method may include coupling a strobe light device to the light indicator circuit, and providing a confirmation indication to the user that the controller has been switched to at least one of the armed and disarmed modes using the strobe light device. The confirmation indication may be based upon at least one of a leading edge and a trailing edge of the power supplied by the light indicator circuit to the at least one vehicle light bulb. Also, the confirmation indication may have a duration less than a duration of the selectively supplied power.

Yet another method aspect of the invention is for operating a vehicle security system for a vehicle comprising at least one vehicle light bulb connector. The vehicle security system may include a remote transmitter to be carried by a user and a controller positioned in the vehicle. The controller may be switchable to pt least one of an armed mode and a disarmed mode based upon the remote transmitter. Further, the controller may selectively supply power to the at least one vehicle light bulb connector based upon switching to at least one of the armed and disarmed modes. The method may include coupling a strobe light device to the at least one vehicle light bulb connector, and providing a confirmation indication to the user that the controller has been switched to at least one of the armed and disarmed modes using the strobe light device.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
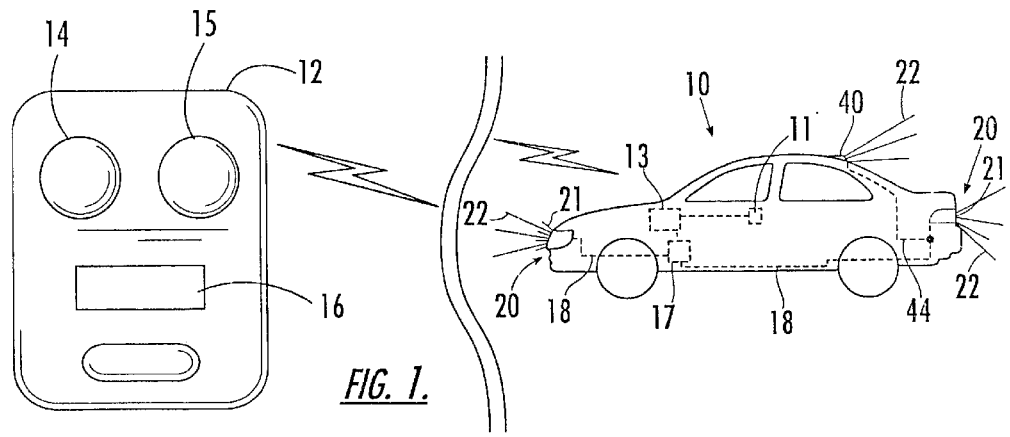
FIG. 1 is a perspective view of a vehicle with a security system according to the invention including a strobe light device.

Turning now to FIG. 1, a security system for a vehicle 10 according to the invention includes at least one vehicle sensor 11, a remote transmitter 12 to be carried by a user, and a controller 13 positioned in the vehicle. The controller 13 may be positioned within the dashboard of the vehicle 10, for example, and is connected to a light indicator circuit 17, as illustratively shown. The light indicator circuit 17 may be a relay, for example, although other suitable devices known to those skilled in the art may also be used. The light indicator circuit 17 supplies power from the vehicles battery to various vehicle light bulbs, such as headlight bulbs, parking light bulbs, dome light bulbs,. etc. The light indicator circuit 17 may be connected to the light bulbs of the vehicle 10 by a wiring system 18, for example.

The controller 13 is preferably switchable to at least one of an armed mode and a disarmed mode based upon the remote transmitter 12. In the armed mode, the controller 13 generates an alarm indication responsive to the vehicle sensor 11. For example, the security system may include a siren (not shown), and the controller 13 may cause the siren to generate the alarm indication, though other alarm devices may also be used.

More particularly, the remote transmitter 12 may include a first button 14 that may be pressed to cause the controller 13 to switch to the armed mode, and a second button 15 to cause the controller to switch to the unarmed mode. Furthermore, the remote transmitter 12 may also include a third button 16, which may be a "panic" button, for example, that causes the controller 13 to immediately generate the alarm indication.

Moreover, the controller 13 may cause the light indicator circuit 17 to supply power to one or more of the light bulbs of the vehicle 10 upon switching to at least one of the armed and disarmed modes. For example, this allows the parking light bulbs of the vehicle 10 to be flashed as a confirmation indication that the controller 13 has received a signal from the remote transmitter 12 and/or performed a certain function, as discussed above. Yet, if only the parking light bulbs of the vehicle 10 are flashed as a confirmation indication, the confirmation indication may not be very bright, as illustratively shown by the short luminosity lines 21. As a result, it may be difficult for the user to see such a confirmation indication if he is not close to the vehicle 10.

According to the invention, the security system may also include one or more strobe light devices 20 at the vehicle 10. Each strobe light device 20 provides a confirmation indication to the user that the controller 13 has been switched to at least one of the armed and disarmed modes. However, the strobe light device 20 of the present invention provides a strobe light confirmation indication that is significantly brighter than that of conventional parking light bulbs, for example, as illustratively shown by the long luminosity lines 22 of FIG. 1.

Figure 2:
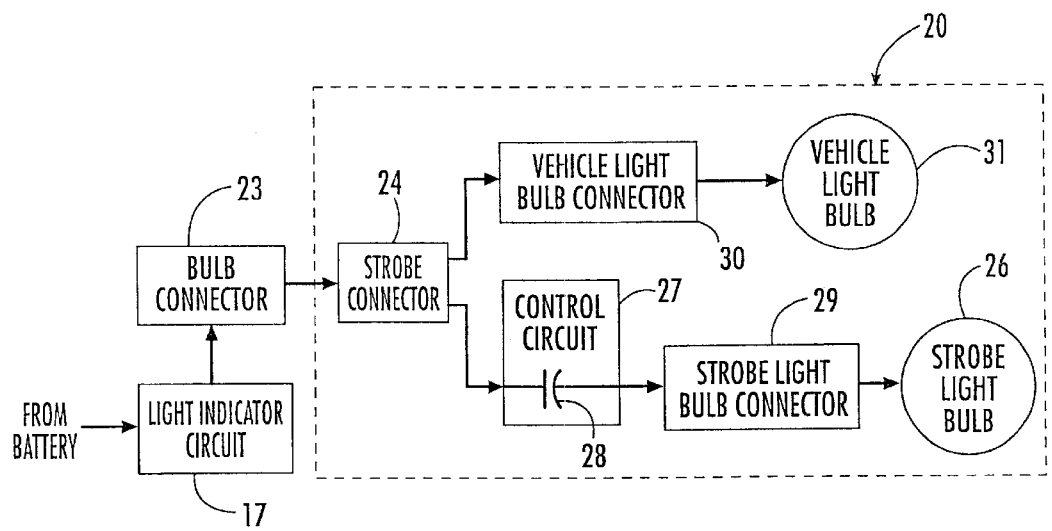
FIG. 2 is a schematic block diagram of the strobe light device of FIG. 1.
Figure 3:
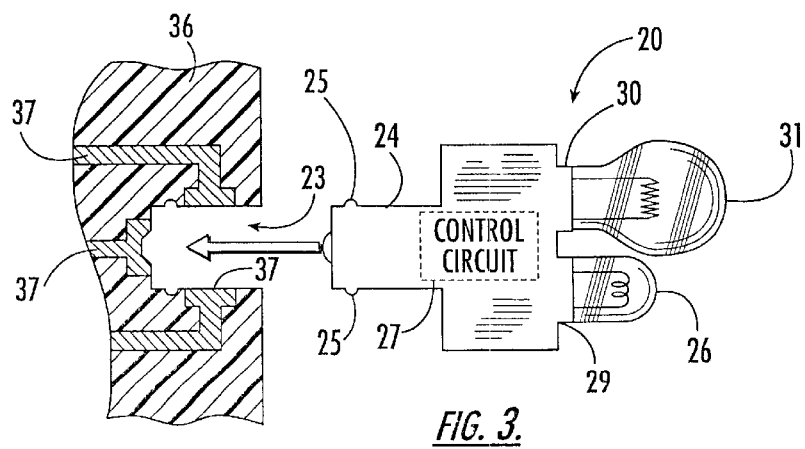
FIG. 3 is a side view illustrating an embodiment of the strobe light device of FIG. 1.

Referring more particularly to FIGS. 2 and 3, the vehicle 10 includes one or more vehicle light bulb connectors 23, such as the vehicle's parking light bulb connectors, for example. The vehicle light bulb connector 23 may be within a plastic vehicle light housing 36, for example, and connected to the wiring system 18 of the vehicle 10 via conductors 37. The controller 13 may cause the light indicator circuit 17 to selectively supply power to the vehicle light bulb connector 23 based upon being switched to at least one of the armed and disarmed modes, as described above. The strobe light device 20 is preferably electrically connected to the vehicle light bulb connector 23 by a strobe connector 24. For example, the vehicle light bulb connector 23 may be a socket, and the strobe connector 24 may be a plug for mating with the socket, as illustratively shown in FIG. 3.

As a result, the strobe light device 20 according to the present invention may be used to retrofit existing vehicle security systems without having to run additional wiring or modify existing vehicle light bulb connectors. The strobe connector 24 of the strobe light device 20 may be manufactured to connect with numerous vehicle parking light bulb sockets as well as other types of vehicle light sockets. As seen in FIG. 3, for example, the strobe connector 24 may include bayonet type connectors 25 for mating with the vehicle light bulb socket 23. Of course, the strobe connector 24 may include threads or other suitable attachments and may be made in different sizes, as will be appreciated by those of skill in the art.

The strobe light device 20 further includes a strobe light bulb 26 carried by the strobe connector 24 and a control circuit 27. More particularly, the strobe light device 20 may include a strobe light connector 29 which carries the strobe light bulb 26. Again, bayonet type connectors, threads, or other suitable attachments may be used to connect the strobe light bulb 26 to the strobe light connector 29, as similarly described above. The control circuit 27 receives power via the strobe connector 24 and causes the strobe light bulb 26 to provide the confirmation indication. For example, the control circuit 27 may include a capacitor 28 for storing and discharging power.

Figure 4:
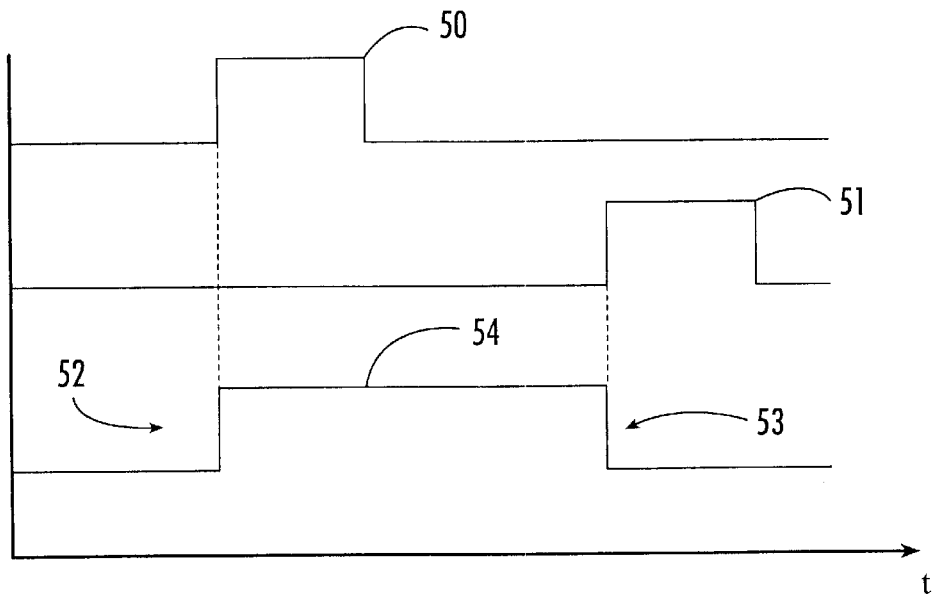
FIG. 4 is a timing diagram illustrating the timing of various confirmation indications provided by the strobe light device of FIG. 1.

Turning now to FIG. 4, the control circuit 27 may cause the strobe light bulb 26 to provide the confirmation indication, illustrated as pulses 50, 51 based upon a leading edge 52 and/or a trailing edge 53, respectively, of the power 54 supplied by the light indicator circuit 17, for example. As a result, the strobe light bulb 26 need not be operational when a vehicle light bulb 31 is otherwise on. Thus, the duration of the confirmation indication may be less than a duration that the power 54 is selectively supplied by the light indicator circuit 17. That is, if the vehicle light bulb 31 is used as a parking light bulb, for example, the strobe light bulb 26 may be set to only flash when the parking lights are turned on or off (i.e., on the leading or trailing edge 52, 53 of the power 54 supplied thereto, respectively), not the entire time that they are on. Accordingly, the strobe light device 20 of the present invention may advantageously provide a strobe light confirmation that does not continually flash the entire duration the vehicle light bulb 31 is being used for other vehicle light applications (e.g., park lights).

Furthermore, the control circuit 27 may cause the strobe light bulb 26 to provide the confirmation indication for a predetermined duration. Additionally, the control circuit 27 may cause the strobe light bulb 26 to flash one or more times. Of course, if more than one flash is desired it may be necessary to adjust the duration during which the controller 13 causes the light indicator circuit 17 to supply power to the vehicle light bulb connector 23 to allow additional charging time, as will be appreciated by those of skill in the art.

The strobe light device 20 may also advantageously include a light bulb connector 30 for carrying the vehicle light bulb 31. The light bulb connector 30 is preferably of the same type as the vehicle light bulb connector 23. In this way, the same bulb recommended by the manufacturer of the vehicle 10 for the vehicle light bulb connector 23 may be used in the light bulb connector 30. Even so, the light bulb connector 30 may be of a different type than the vehicle light bulb connector 23 so that light bulbs other than the recommended vehicle light bulb may be used.

It is also preferable that the strobe light bulb 26 have a greater luminosity than the vehicle light bulb 31. The confirmation indication provided by the strobe light bulb 26 will therefore be much brighter than that provided by just the vehicle light bulb 31. Yet, since the strobe light device 20 may also include the vehicle light bulb 31, the vehicle light bulb is still available for normal vehicle applications (e.g., parking lights).

The vehicle security system of the present invention may also be used with a vehicle including power door locks. The power door locks may include one or more actuators (not shown) for locking and unlocking the doors, and the controller 13 may selectively operate the power door locks based upon the remote transmitter 12. By way of example, the first button 14 of the remote transmitter 12 may be used to lock the doors, the second button 15 may be used to unlock the doors, and the third button 16 may be used to cause a trunk actuator (not shown) to open the trunk of the vehicle 10. In such case, the strobe light device 21 may be used to provide the confirmation indication to the user, indicating that the controller 13 has selectively operated the power door locks, as similarly described above.

Of course, those of skill in the art will appreciate that the vehicle security system may be used to provide either the alarm function or the door locking/unlocking function, or both. For example, the first button 14 of the remote transmitter 12 may cause the controller 13 to both lock the doors of the vehicle 10 and to switch to the armed mode, and the second button 15 may similarly cause the controller to both unlock the doors and switch to the disarmed mode. The remote transmitter may also include separate buttons so that the above functions may be individually selected as well.

Figure 5:
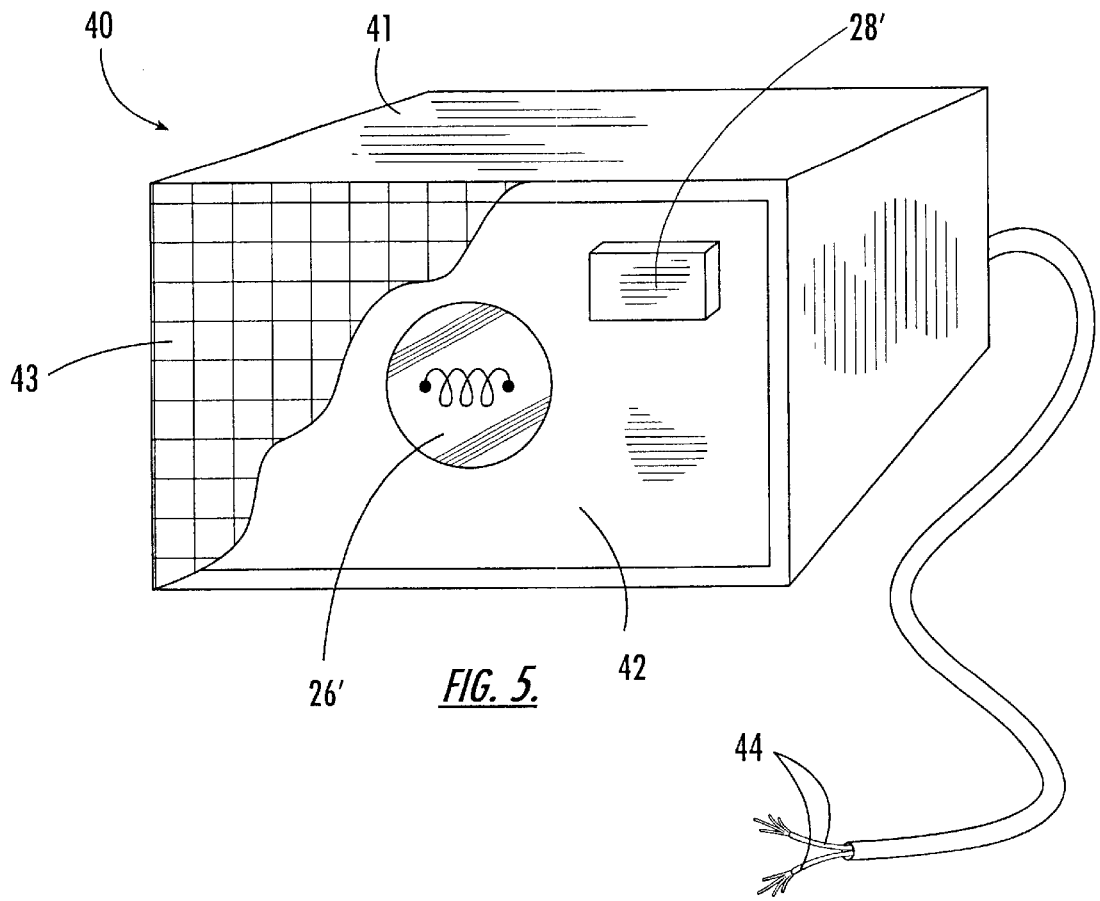
FIG. 5 is a perspective view of an alternate embodiment of a strobe light device according to the invention.

Referring now to FIG. 5, an alternate strobe light indicator 40 according to the invention may also be used either in place of or in conjunction with the strobe light connector 20. The strobe light connector 40 may include a housing 41 suitable for mounting on the vehicle 10 and a circuit board 42 carried by the housing. The strobe light indicator 40 may similarly include a strobe light bulb 26' and a control circuit 27' carried by the circuit board 42. The strobe light bulb 26' and the control circuit 27' may operate as previously described above.

Further, a lens 43 may be used to enclose the circuit board 42 within the housing 41 and provide protection from moisture, physical damage, etc. Of course, the strobe light device 40 may include a reflector for the strobe light bulb 26', if desired. The strobe light device 40 may be connected to the wiring system 18, and thus to the light indicator circuit 17, by wires 44, for example. As may be seen in FIG. 1, the wires 44 may be connected to the wiring system at a convenient location near the tail lights of the vehicle 10, though other connection locations may also be used.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A vehicle security system for a vehicle comprising at least one vehicle light bulb and a light indicator circuit for providing power thereto, the vehicle security system comprising:
    at least one vehicle sensor;
    a remote transmitter to be carried by a user;
    a controller positioned in the vehicle and electrically connected to the at least one vehicle light indicator circuit, said controller being switchable to at least one of an armed mode and a disarmed mode based upon said remote transmitter, said controller for causing the light indicator circuit to selectively supply power to the at least one vehicle light bulb upon switching to at least one of the armed and disarmed modes and for generating an alarm indication responsive to said at least one vehicle sensor in the armed mode; and
    a strobe light device at the vehicle and electrically connected to the light indicator circuit for providing a confirmation indication to the user that said controller has been switched to at least one of the armed and disarmed modes based upon at least one of a leading edge and a trailing edge of the power supplied by the light indicator circuit to the at least one vehicle light bulb, the confirmation indication having a duration less than a duration of the selectively supplied power.

2. The vehicle security system of claim 1 wherein the vehicle comprises power door locks; wherein said controller selectively operates the power door locks based upon said remote transmitter; and wherein said strobe light device provides the confirmation indication based upon said controller selectively operating the power door locks.

3. The vehicle security system of claim 1 wherein the vehicle comprises at least one vehicle light bulb connector electrically connected to the light indicator circuit; and wherein said strobe light device is electrically connected to the light indicator circuit via the at least one vehicle light bulb connector.

4. The vehicle security system of claim 3 wherein said strobe light device comprises:
  a strobe connector electrically connected to the at least one vehicle light bulb connector;
  a strobe light bulb carried by said strobe connector; and
  a control circuit for receiving power and causing said strobe light bulb to provide the confirmation indication.

5. The vehicle security system of claim 4 wherein the at least one vehicle light bulb connector comprises a socket, and wherein said strobe connector comprises a plug mating with the socket.

6. A vehicle security system for use with a vehicle comprising power door locks, at least one vehicle light bulb, and a light indicator circuit for providing power to the at least one vehicle light bulb, the vehicle security system comprising:
  a remote transmitter to be carried by a user;
  a controller positioned in the vehicle and electrically connected to the at least one vehicle light indicator circuit, said controller selectively operating the power door locks based upon said remote transmitter and causing the light indicator circuit to selectively supply power to the at least one vehicle light bulb upon selectively operating the power door locks; and
  a strobe light device at the vehicle and electrically connected to the light indicator circuit for providing a confirmation indication to the user that said controller has selectively operated the power door locks based upon at least one of a leading edge and a trailing edge of the power supplied by the light indicator circuit to the at least one vehicle light bulb, the confirmation indication having a duration less than a duration of the selectively supplied power.

7. The vehicle security system of claim 6 wherein the vehicle comprises at least one vehicle light bulb connector electrically connected to the light indicator circuit; and wherein said strobe light device is electrically connected to the light indicator circuit via the at least one vehicle light bulb connector.

8. The vehicle security system of claim 7 wherein said strobe light device comprises:
  a strobe connector electrically connected to the at least one vehicle light bulb connector;
  a strobe light bulb carried by said strobe connector; and
  a control circuit for receiving power and causing said strobe light bulb to provide the confirmation indication.

9. The vehicle security system of claim 8 wherein the at least one vehicle light bulb connector comprises a socket, and wherein said strobe connector comprises a plug mating with the socket.

10. The vehicle security system of claim 9 wherein the socket comprises a parking light bulb socket.

11. A vehicle security system for a vehicle comprising at least one vehicle light bulb connector and comprising:
  at least one vehicle sensor;
  a remote transmitter to be carried by a user;
  a controller positioned in the vehicle and being switchable to at least one of an armed mode and a disarmed mode based upon said remote transmitter, said controller for selectively supplying power to the at least one vehicle light bulb connector based upon switching to at least one of the armed and disarmed modes and for generating an alarm indication responsive to said at least one vehicle sensor in the armed mode; and
  a strobe light device at the vehicle and electrically connected to the at least one vehicle light bulb connector for providing a confirmation indication to the user that said controller has been switched to at least one of the armed and disarmed modes.

12. The vehicle security system of claim 11 wherein said strobe light device provides the confirmation indication based upon at least one of a leading edge and a trailing edge of the power supplied by said controller to the at least one vehicle light bulb connector.

13. The vehicle security system of claim 11 wherein the confirmation indication has a duration less than a duration of the selectively supplied power.

14. The vehicle security system of claim 11 wherein the vehicle comprises power door locks; wherein said controller selectively operates the power door locks based upon said remote transmitter; and wherein said strobe light device provides the confirmation indication based upon said controller selectively operating the power door locks.

15. The vehicle security system of claim 11 wherein said strobe light device comprises:
  a strobe connector electrically connected to the at least one vehicle light bulb connector;
  a strobe light bulb carried by said strobe connector; and
  a control circuit for receiving power and causing said strobe light bulb to provide the confirmation indication.

16. The vehicle security system of claim 15 wherein the at least one vehicle light bulb connector comprises a socket, and wherein said strobe connector comprises a plug mating with the socket.

17. A vehicle security system for use with a vehicle comprising power door locks and at least one vehicle light bulb connector, the vehicle security system comprising:
  a remote transmitter to be carried by a user;
  a controller positioned in the vehicle for selectively operating the power door locks based upon said remote transmitter and selectively supplying power to the at least one vehicle light bulb connector based upon selectively operating the power door locks; and
  a strobe light device at the vehicle and electrically connected to the at least one vehicle light bulb connector for providing a confirmation indication to the user that said controller has selectively operated the power door locks.

18. The vehicle security system of claim 17 wherein said strobe light device provides the confirmation indication based upon at least one of a leading edge and a trailing edge of the power supplied by said controller to the at least one vehicle light bulb connector.

19. The vehicle security system of claim 17 wherein the confirmation indication has a duration less than a duration of the selectively supplied power.

20. The vehicle security system of claim 17 wherein said strobe light device comprises:
   a strobe connector electrically connected to the at least one vehicle light bulb connector;
   a strobe light bulb carried by said strobe connector; and
   a control circuit for receiving power and causing said strobe light bulb to provide the confirmation indication.

21. The vehicle security system of claim 20 wherein the at least one vehicle light bulb connector comprises a socket, and wherein said strobe connector comprises a plug mating with the socket.

22. The vehicle security system of claim 21 wherein the socket comprises a parking light bulb socket.

23. A strobe light device for a vehicle comprising a vehicle light bulb connector comprising:
   a strobe connector to be electrically connected to the vehicle light bulb connector;
   a light bulb connector carried by said strobe connector for a vehicle light bulb;
   a strobe light bulb carried by said strobe connector; and
   a control circuit for receiving power and causing the strobe light bulb to provide a confirmation indication.

24. The strobe light device of claim 23 wherein said control circuit causes said strobe light bulb to provide the confirmation indication based upon at least one of a leading edge and a trailing edge of power supplied to the vehicle light bulb connector.

25. The strobe light device of claim 23 wherein said control circuit comprises at least one capacitor for storing and discharging power.

26. The strobe light device of claim 23 wherein the vehicle light bulb connector comprises a socket, and wherein said strobe connector comprises a plug mating with the socket.

27. The strobe light device of claim 26 wherein the socket comprises a parking light bulb socket.

28. A strobe light device for a vehicle comprising a vehicle light bulb connector comprising:
   a strobe connector to be electrically connected to the vehicle light bulb connector;
   a vehicle light bulb carried by said strobe connector;
   a strobe light bulb carried by said strobe connector; and
   a control circuit for receiving power and causing said strobe light bulb to provide a confirmation indication.

29. The strobe light device of claim 28 wherein said control circuit causes said strobe light bulb to provide the confirmation indication based upon at least one of a leading edge and a trailing edge of power supplied to the vehicle light bulb connector.

30. The strobe light device of claim 28 wherein said control circuit comprises at least one capacitor for storing and discharging power.

31. The strobe light device of claim 28 wherein the vehicle light bulb connector comprises a socket, and wherein said strobe connector comprises a plug mating with the socket.

32. The strobe light device of claim 31 wherein the socket comprises a parking light bulb socket.

33. The strobe light device of claim 28 wherein said strobe light bulb has a greater luminosity than said vehicle light bulb.

34. A method for operating a vehicle security system for use with a vehicle comprising at least one vehicle light bulb and a light indicator circuit for providing power thereto, the vehicle security system comprising a remote transmitter to be carried by a user and a controller positioned in the vehicle and electrically connected to the light indicator circuit, the controller being switchable to at least one of an armed mode and a disarmed mode based upon the remote transmitter and causing the light indicator circuit to selectively supply power to the at least one vehicle light upon switching to at least one of the armed and disarmed modes, the method comprising:
   coupling a strobe light device to the light indicator circuit; and
   providing a confirmation indication to the user that the controller has been switched to at least one of the armed and disarmed modes using the strobe light device based upon at least one of a leading edge and a trailing edge of the power supplied by the light indicator circuit to the at least one vehicle light bulb, the confirmation indication having a duration less than a duration of the selectively supplied power.

35. The method of claim 34 wherein the vehicle comprises power door locks; wherein the controller selectively operates the power door locks based upon the remote transmitter; and wherein providing the confirmation indication comprises providing the confirmation indication based upon the controller selectively operating the power door locks.

36. The method of claim 34 wherein the vehicle comprises at least one vehicle light bulb connector electrically connected to the light indicator circuit; and wherein the strobe light device is electrically connected to the light indicator circuit via the at least one vehicle light bulb connector.

37. A method for operating a vehicle security system for a vehicle comprising at least one vehicle light bulb connector, the vehicle security system comprising a remote transmitter to be carried by a user and a controller positioned in the vehicle and being switchable to at least one of an armed mode and a disarmed mode based upon the remote transmitter and selectively supplying power to the at least one vehicle light bulb connector based upon switching to at least one of the armed and disarmed modes, the method comprising:
   coupling a strobe light device to the at least one vehicle light bulb connector; and
   providing a confirmation indication to the user that the controller has been switched to at least one of the armed and disarmed modes using the strobe light device.

38. The method of claim 37 wherein providing the confirmation indication comprises providing the confirmation indication based upon at least one of a leading edge and a trailing edge of the power supplied by the controller to the at least one vehicle light bulb connector.

39. The method of claim 37 wherein the confirmation indication has a duration less than a duration of the selectively supplied power.

40. The method of claim 37 wherein the vehicle comprises power door locks; wherein the controller selectively operates the power door locks based upon the remote transmitter; and wherein providing the confirmation indication comprises providing the confirmation indication based upon the controller selectively operating the power door locks.

\* \* \* \* \*